United States Patent [19]
Gruber

[11] Patent Number: 5,791,287
[45] Date of Patent: Aug. 11, 1998

[54] SPLASH-RESISTANT PET WATER VESSEL

[76] Inventor: Don Gruber, Box 422, Pacific Grove, Calif. 93950

[21] Appl. No.: 763,475

[22] Filed: Dec. 11, 1996

[51] Int. Cl.$^6$ ............................................. A01K 7/00
[52] U.S. Cl. ................................. 119/74; 119/61
[58] Field of Search ..................... 119/74, 61, 72, 119/69.5; 47/71

[56] References Cited

U.S. PATENT DOCUMENTS

| | | | |
|---|---|---|---|
| 2,583,911 | 1/1952 | Webster | 119/69.5 |
| 3,076,435 | 2/1963 | Seymour . | |
| 3,152,576 | 10/1964 | Faurot . | |
| 3,745,977 | 7/1973 | Martin | 119/73 |
| 3,749,063 | 7/1973 | Buffum | 119/61 |
| 4,286,546 | 9/1981 | Moore | 119/61 |
| 4,436,056 | 3/1984 | MacLeod | 119/72 |
| 5,297,504 | 3/1994 | Carrico | 119/61 |

Primary Examiner—Michael J. Carone
Assistant Examiner—Yvonne R. Abbott

[57] ABSTRACT

A vessel for transportation of water for animals, having a great resistance to splashing while offering easy access to the liquid. Most of the water within the vessel is below a substantially concave floating dish, while a smaller portion of water is within the dish; the animal accesses only the smaller portion. Water flows from below the dish to above through an opening in the dish. The floating dish prevents the splash of water by floating against an arched lid, blocking the flow of water, and by directing the flow of water under the lid, made possible by protrusions in the lid. Splash as a result of kicking or dropping is prevented by a plate over the hole in the floating dish.

16 Claims, 7 Drawing Sheets

SPLASH-RESISTANT PET WATER VESSEL

BACKGROUND—FIELD OF INVENTION

This invention relates to the field of animal husbandry, particularly to animal watering devices, and specifically to such devices which prevent the accidental or incidental spilling of water or other liquid while traveling, or otherwise subject to movement.

BACKGROUND—DESCRIPTION OF PRIOR ART

Pets in the United States and other modern countries number in the many millions, and in many families are regarded as members of that family. Therefore, those pets live and travel with the family as an equal member of the household. Because of that, it is necessary to provide for those animals with food and water in circumstances in which spillage is undesirable. Such circumstances occur in houses and automobiles of these families, in which spilled food and water cause disturbing mess and disorder.

There have been several attempts by inventors to remedy this situation, but all of the previous attempts have lacked in important features. U.S. Pat. No. 3,076,435 to Seymour (1963) describes a two-piece bowl which limits spillage, but is quite complex in construction. It presents a troublesome refill procedure and cleaning process. In addition, the surface of the liquid is small and distant from the rim of the bowl, near the bottom of a conical cavity; this limits the size of the muzzle that could access the liquid. Also, the animal cannot easily see what it is drinking, and may resist using the bowl.

U.S. Pat. No. 3,152,576, issued to Faurot in 1964 offers anti-splash features in a water bowl. In this invention it is necessary that the opening presenting the liquid be narrow and deep. This again limits the access for large muzzles and ability to see the liquid. Furthermore, it is still subject to splashing in moderately jarring conditions, and, as it would splash more when full, works best when there is only a minimal amount of liquid in the bowl. This invention and Seymour's invention above do not prevent a jet of water from escaping when subjected to a sudden compressing force such as would result from a kick to the bowl, or from dropping it.

The patent issued to Martin in 1973, U.S. Pat. No. 3,745,977, addresses hogs in the field, not pets in homes and cars. The float device in this patent is meant to insulate water from freezing, and has no splash control function.

U.S. Pat. No. 4,286,546 to Moore (1981) offers a device described as antisplash, but, as in the above cited patents, allows only a small amount of water to be presented to the animal. Its splash prevention is limited to the time when the animal is actually using the device, and is subject to spillage during bumpy rides or when kicked. The float device does not prevent liquid from escaping around its perimeter, nor from splashing up through its center aperture.

While desirably simple, U.S. Pat. No. 4,436,056 issued to MacLeod (1984) will still splash in moderately rough conditions or when kicked or dropped. The higher the level of liquid in the bowl, the more likely this is.

U.S Pat. No. 5,297,504 to Carrico (1994) describes a water bowl with a center dish designed to reduce splashing, yet water quantities in the device remain small, unless accompanied by a remote replenishing system, thusly requiring frequent refilling. Furthermore, as in other inventions described above, splash is prevented only in conditions of minimal disturbance, and not prevented in moderately rough conditions or in circumstances of kicking or dropping.

OBJECTS AND ADVANTAGES

Accordingly, several objects and advantages of my invention are:

(a) to provide a pet watering device which has a high degree of splash resistance for both travel and home use;

(b) to provide a pet watering device to which animals of various sizes have easy access;

(c) to provide a pet watering device which contains sufficient liquid to preclude the necessity of frequent refilling;

(d) to provide a pet watering device which is easily cleaned;

(e) to provide a pet watering device which resists splashing when kicked;

(f) to provide a pet watering device in which the liquid is easily seen by the animal;

(g) to provide a pet watering device which resists splashing when dropped from a moderate height, or in a very bumpy ride which produces sharp changes of direction;

(h) to provide a pet watering device which can be economically manufactured;

(i) to provide a pet watering device which can be easily re-assembled after cleaning;

(j) to provide a pet watering device which is successfully operational in various sizes; and (k) to provide a pet watering device in which the liquid is usually in such a position in which the animal need not reach deeply into the bowl.

My invention successfully addresses the deficiencies of the prior art described above, and achieves these and other objects through new and previously untaught means. Means for accomplishing the objects of the present invention comprise a floating dish with a cover plate and a curved lid, with devices affixed to perform a substantially complete closure, i.e., a near but not complete closure, of the floating dish and the curved lid, which separately and in combination perform various functions, and which in total achieve the desired results.

The floating dish separates the liquid into a primary and a reserve body, presenting the animal with an adequate amount of water while permitting a substantial amount in reserve. The liquid freely flows between these two bodies through means of holes or other openings in the floating dish. When the liquid is in motion, the floating dish forms a near closure with the curved lid, preventing the reserve liquid from splashing. The configuration of the floating dish directs liquid from the primary body into a chamber formed by the curve of the lid. This chamber tends to re-direct the liquid downward and toward the primary body, preventing splash from that body. A cover plate on the floating dish prevents water from shooting out through the flow holes from a sudden compressive force, such as would occur in circumstances of kicking or dropping.

DRAWING FIGURES

In the drawings, closely related figures have the same number but different alphabetical suffixes. Further objects of this invention and additional features and the advantages thereof will be evident in the following descriptions and drawings of the invention in its preferred and optional embodiments.

FIG. 4b is a vertical, sectional, detail view of the same process as seen in FIG. 4a.

Figure 1:
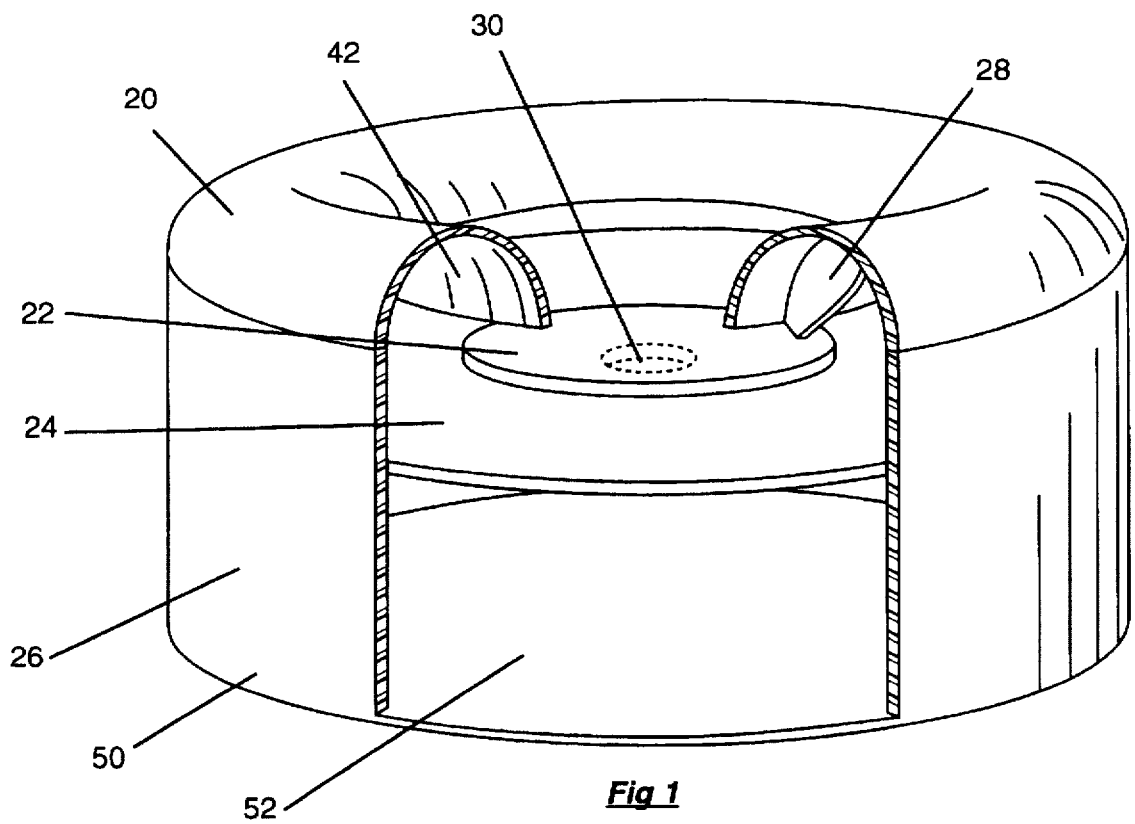
FIG. 1 is a comprehensive view of the invention, in perspective, cutaway and transparent style.

REFERENCE NUMERALS IN DRAWINGS 20 curved lid
22 cover plate
24 floating dish
26 bowl
28 web
30 aperture
32a reserve liquid
32b primary liquid
34 float ring
36 bowl joint
37 lid joint
38 cover plate attaching means
42 splash chamber
44 lid protrusion
46 radiating rib
48 Alternate cover plate
50 sidewall
52 bottom
54 access opening DESCRIPTION—FIGS. 1, 2, 4b, 6d, 7, 8

A typical embodiment of the present invention can be seen in FIGS. 1 (perspective cutaway) and 2a (perspective exploded). The splash-resistant pet water bowl has a bowl 26, which is cylindrical in nature in this embodiment, having a bottom 52, vertical, or nearly vertical, cylindrical sidewall 50, and a bowl joint 36. The bowl 26 could be of a configuration other than cylindrical, such as cubical or polygonal, but in this, the preferred embodiment, it is cylindrical. It must have the qualities of being watertight throughout its sides and bottom, and its bowl joint 36 must be of such a nature that it forms a watertight seal when mated with the lid joint 37. In the preferred embodiment the material is injection molded polyethylene or ABS plastic, but the bowl is not limited to such, and may be formed of such material as ceramic, metal, wood, or other material offering qualities of being watertight, resilient and cleanable.

The bowl joint 36 fits sealingly with the lid joint 37 in any manner appropriate to the material used for the device. In this polyethylene embodiment the method of joining the two pieces could be one of the many typical structures used for snap lids of common household storage bowls. The lid 20 follows the shape of the bowl 26, describing in this embodiment a circle.

Above the lid joint 37 the lid 20 rises, generally extending upward in a manner which continues the slope of the sidewall 50 of the bowl 26 for a short distance, then quickly arcs inward until parallel with the bottom 52, then follows a reduced yet continuous arc until an inner access opening 54 is formed, the lip of which is approximately the same distance from the bottom 52 as is the underside of the lid joint 37 in this embodiment. The exactness of said distance is not critical, and may in other embodiments be higher or lower. The lid 20 may be made of the same or similar material as the bowl 26.

Figure 2A:
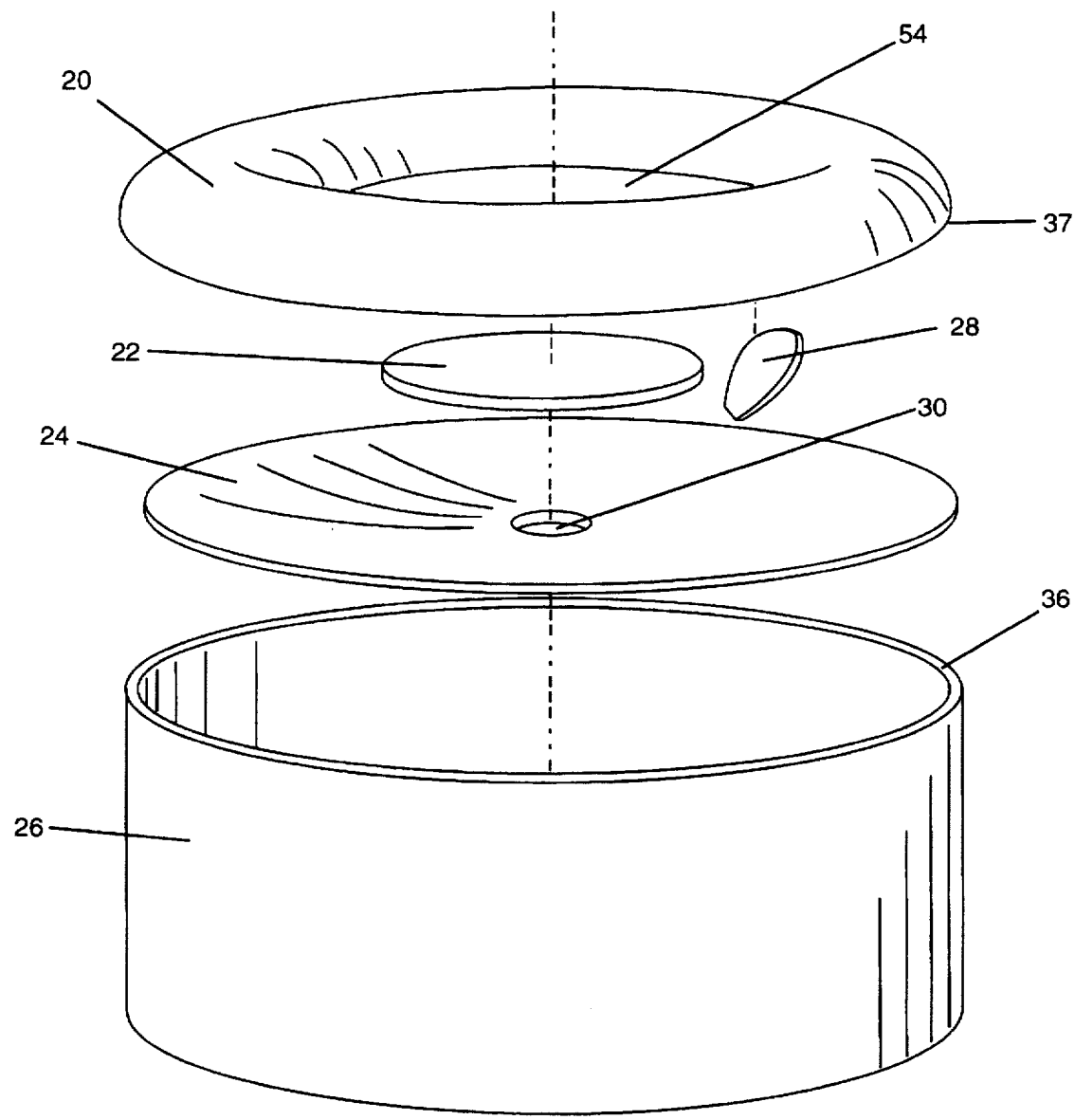
FIG. 2a is an exploded perspective view of the preferred embodiment, showing its five main components.
Figure 2B:
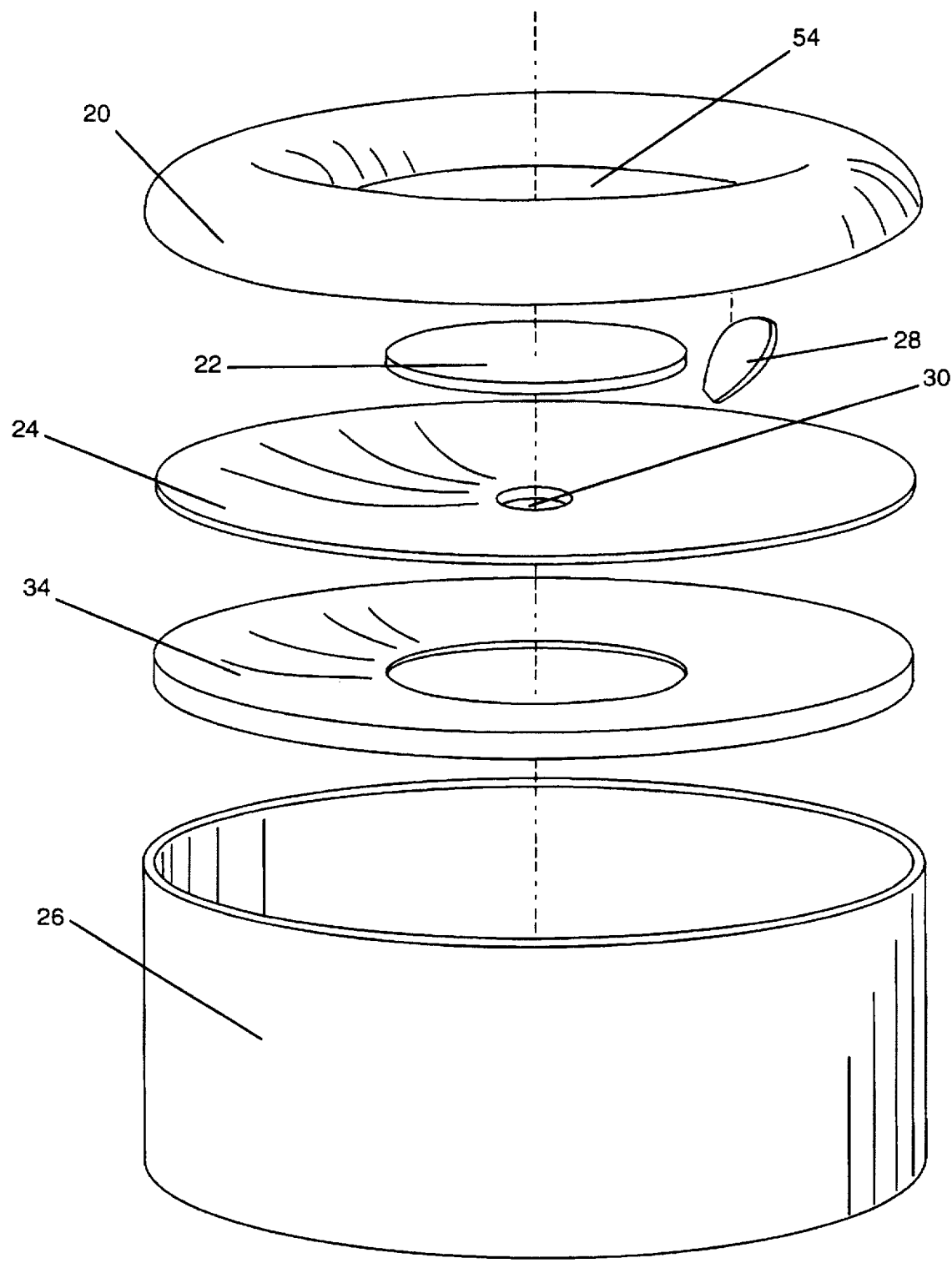
FIG. 2b is similar to FIG. 2a, except it shows an additional component, a float ring, which makes this an optional embodiment.
Figure 4A:
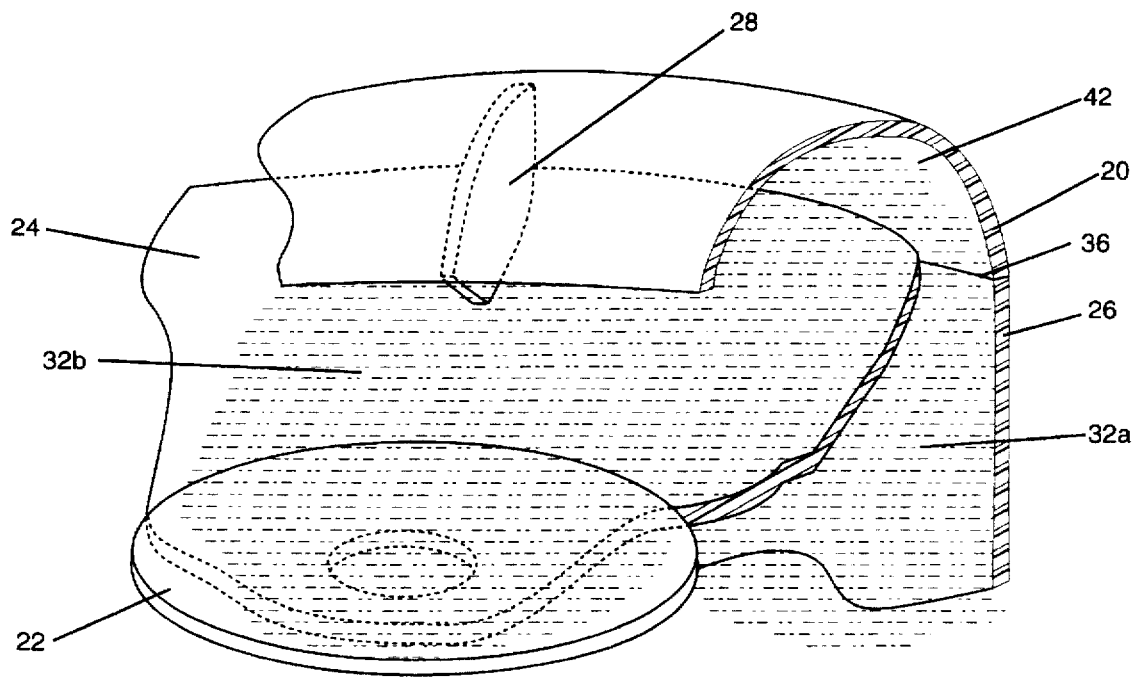
FIG. 4a is a cross sectional, perspective detail view of the invention showing how the floating dish, curved lid and web combine to prevent splashing for the reserve liquid.
Figure 4B:
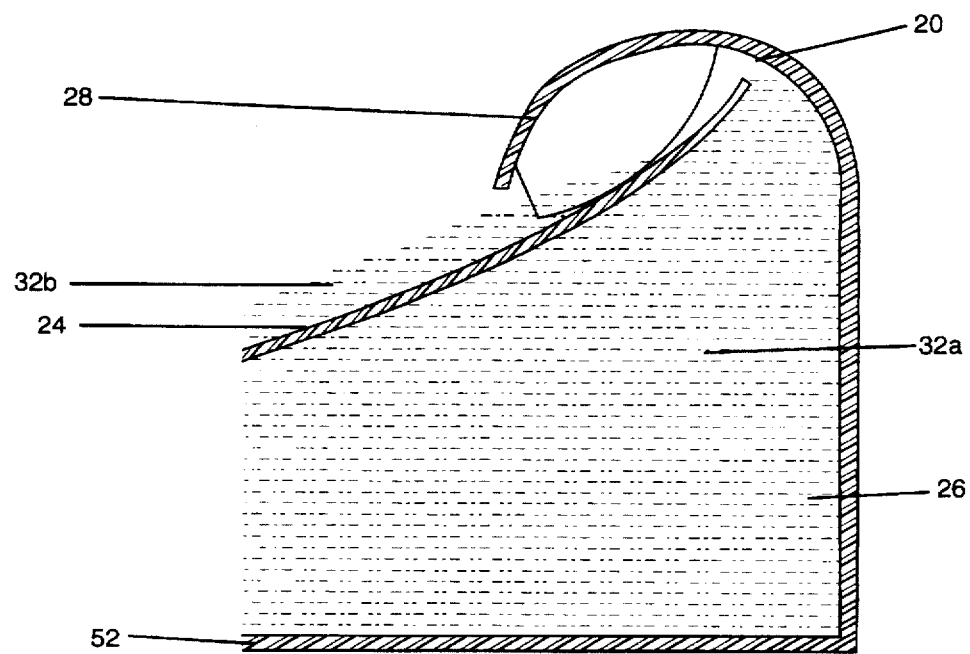

Molded to the lid 20 in this embodiment, or possibly formed separately and attached later in other embodiments, is a web 28, best seen in FIGS. 2a and 4b. The web 28 is of the same material as the lid 20 and of a thickness necessary for its function. The bottom edge of the web 28 generally begins in the highest point of the underside of the lid 20, and arcs downward following a radius that is generally less than that of the concave shape of the floating dish 24. The arc of the web 28 ends at a point somewhat below that of the innermost and lowest part of the lid 20. From that point the web 28 rises directly to the lid 20, where it is attached along its upper arc to the underside of the lid 20. The lid 20 would have at least four webs 28, evenly dispersed, and possibly six or more.

Figure 6A:
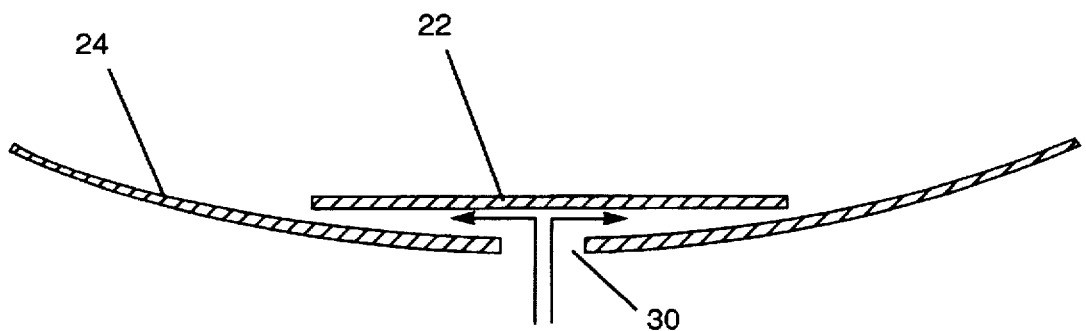
FIG. 6a is a cross sectional detail of the floating dish and cover plate showing how reserve liquid enters the floating dish beneath the cover plate.
Figure 6B:
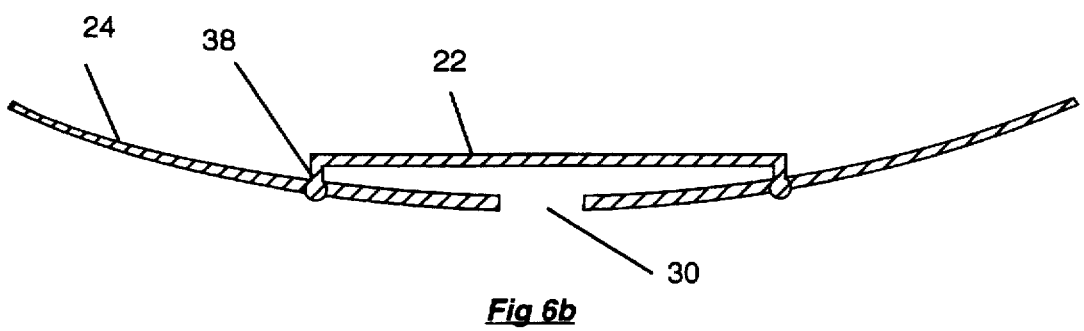
FIG. 6b is a cross sectional detail of the floating dish and cover plate showing a possible attaching means of the cover plate to the floating dish.

The floating dish 24 is concave and possesses a circumference which corresponds in shape to that of the bowl 26 of the embodiment, which is in this case cylindrical, so the floating dish 24 is round. The diameter of the of the floating dish 24 is slightly less than the inside diameter of the bowl 26. In an area of the floating dish 24 near its lowest point occurs an aperture 30, or a series of them, of sufficient dimension to pass liquid easily and quickly. The aperture 30 may be replaced in other embodiments by slots, perforations, meshes or other similar openings which pass liquid. Covering the aperture 30, and upwardly offset somewhat occurs a cover plate 22, which may be rectangular in shape, or round, or other shape. It is attached to the floating dish 24 in some removable manner such as is indicated here in FIG. 6b by a cover plate attaching means 38. Other attaching methods may occur in other embodiments. The material of the floating dish 24 may be distinct from the material of the other components of the present invention; the material must be such that it floats very lightly, yet has sufficient strength and resilience for its function The cover plate 22 may be of the same or different material.

Figure 6C:
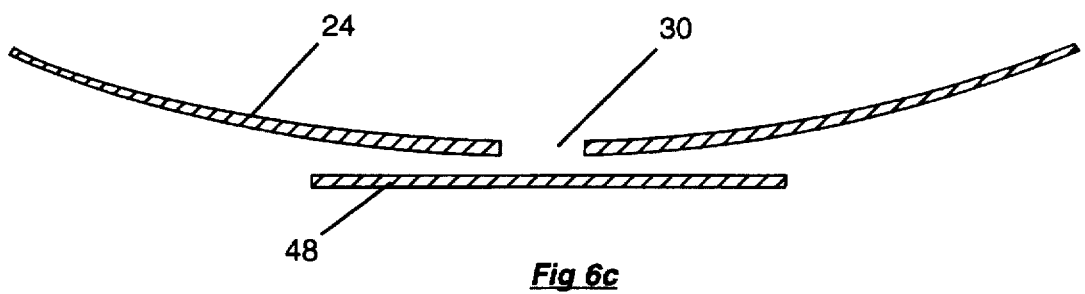
FIG. 6c is a cross sectional detail of the floating dish showing another embodiment similar to that of FIG. 6b, in which the cover plate is below the bottom of the floating dish.
Figure 7:
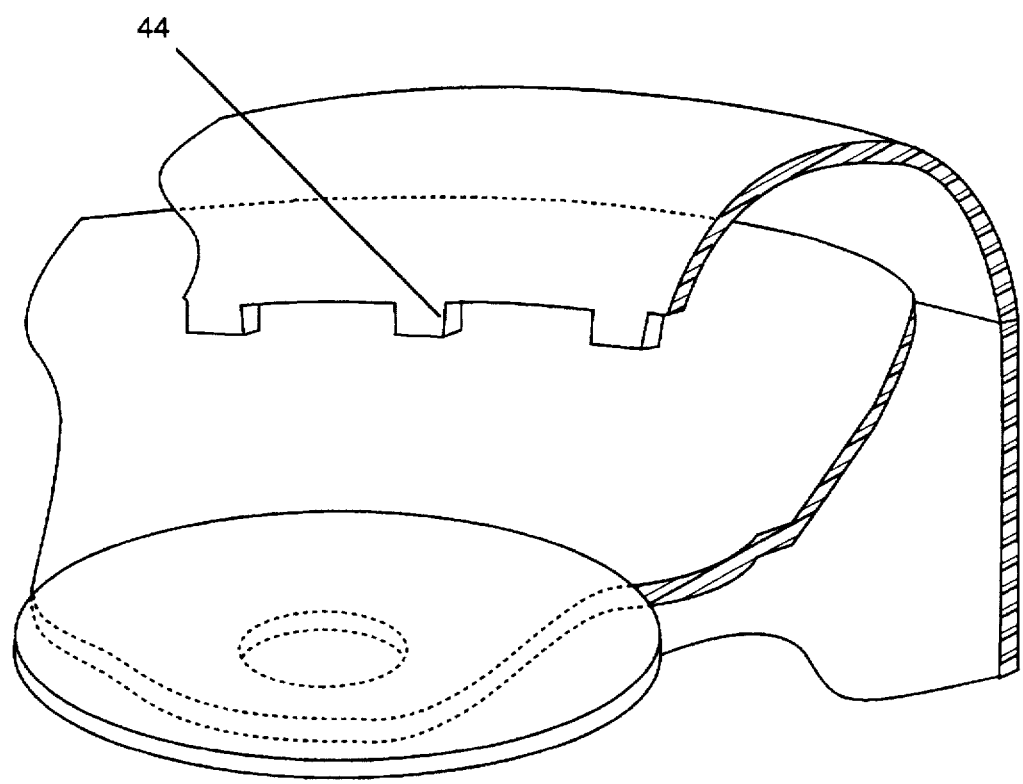
FIG. 7 is a perspective, sectional detail showing another embodiment, featuring an alternative to the web structure.
Figure 8:
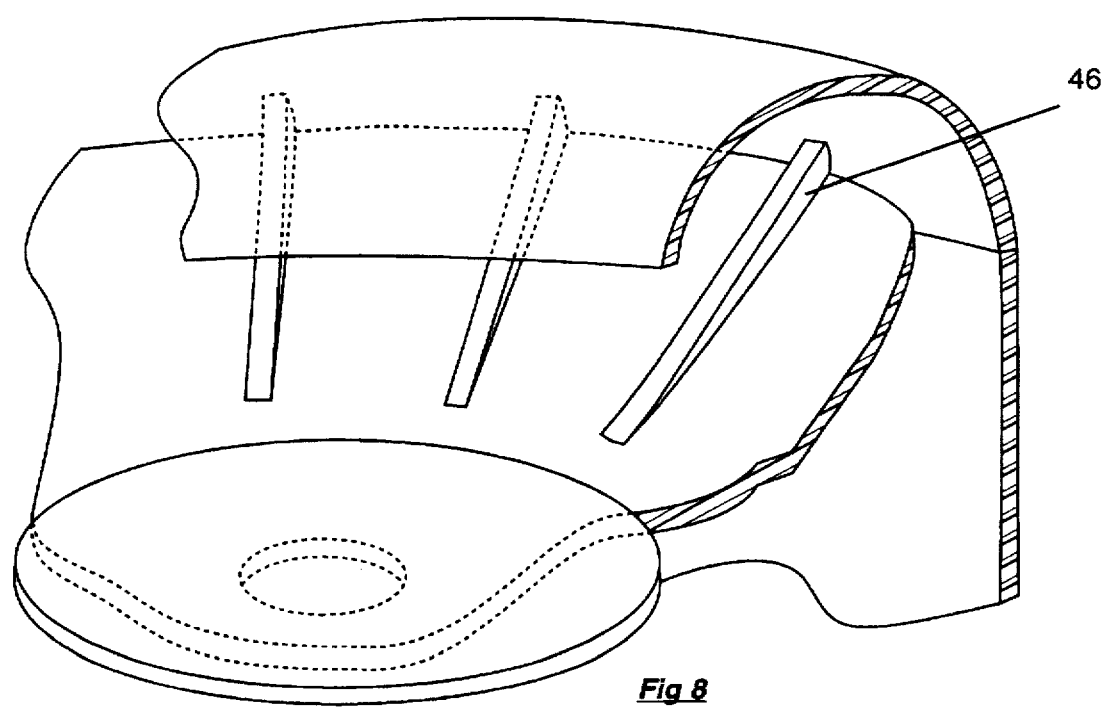
FIG. 8 is a perspective sectional detail showing yet another embodiment, with no liquid present, featuring another alternative to the web structure.

Other possible embodiments of the critical components are described herein, but the present invention should not be construed to be limited to only the embodiments shown or described; the novel and previously untaught characteristics of the present invention remain despite minor or even major variations in configuration and material. In FIG. 2a is another embodiment of the floating dish 24, in which the desired floating characteristic is applied through the addition of a float ring 34, which is a high floatation material placed under the floating dish 24, and separate from it. The float ring 34 generally follows the diameter of the floating dish 24, and is of a thickness calculated to be necessary to give the floating dish the desired buoyancy. FIG. 6c depicts an alternate cover plate 48, which is another embodiment of the cover plate that occurs on the underside of the floating dish 24. It is downwardly offset and may follow the concave curve of the floating dish 24. FIG. 7 shows an alternative embodiment in which the web 28 of FIG. 4b is replaced by lid protrusion 44, to provide similar function. FIG. 8 shows yet another embodiment which also replaces the web 28 of FIG. 4b through the use of radiating ribs 46 on the floating dish 24. The radiating ribs 46 are raised surface elements of the floating dish 24 and number four or more.

OPERATION—FIGS. 1-8

Figure 3:
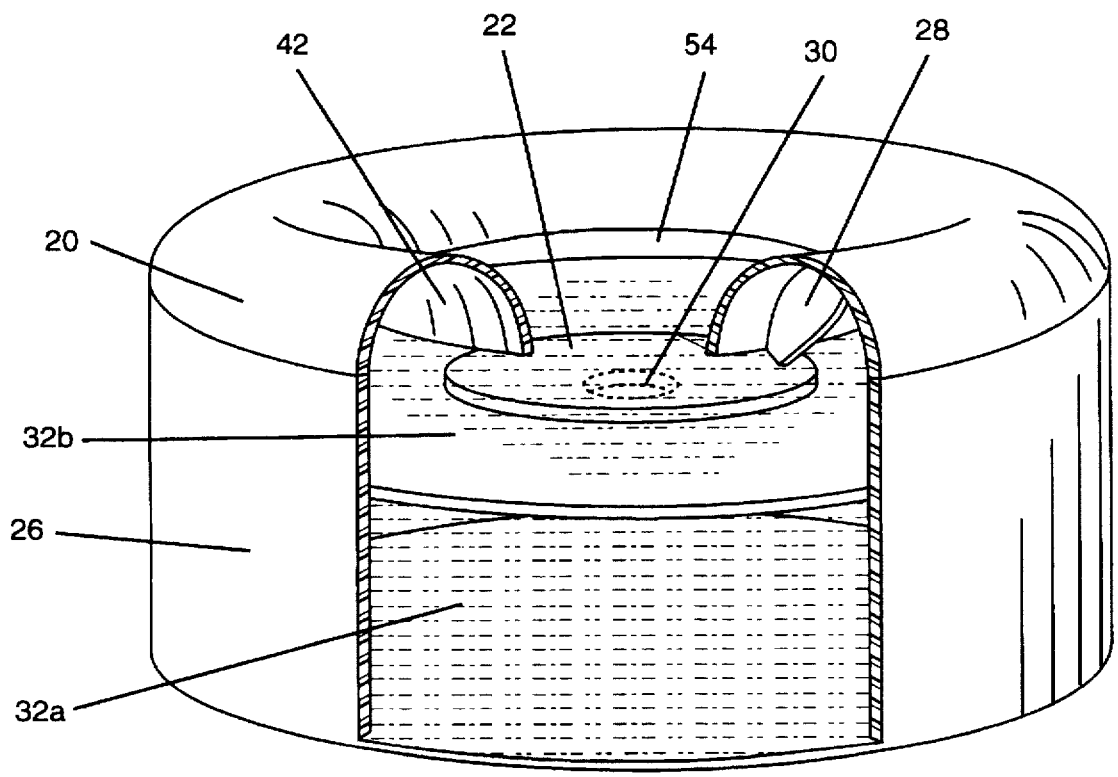
FIG. 3 is similar to the perspective view of FIG. 1, except the liquid is shown in place, in a static condition.

The floating dish 24 floats at and just below the surface of a body of water contained in the bowl 26, as is best observed in FIG. 3. As there exists one or more apertures 30 in the floating dish 24, water flows freely between the bowl 26 and the floating dish 24 through said apertures 30. This effectively divides the water into two bodies, one of reserve liquid 32a, in the bowl 26, and below the floating dish 24, and one of primary liquid 32b, contained in the floating dish 24.

The animal accesses the liquid through the access opening 54 of the curved lid 20, and can access only the primary liquid 32b. As primary liquid 32b is drunk, it is constantly and immediately replenished from the reserve liquid 32a, which flows through the aperture 30 in the floating dish 24, around the underside and on top of the coverplate 22. The floating dish descends with the decreasing level of the liquid, and the primary liquid is constantly available to the animal until nearly all the liquid in the bowl is gone. A possible alternate embodiment is that the flat bottom 52 of the bowl 26 could be shaped as a dish to reflect the shape of the floating dish 24, so that the floating dish 24 would descend neatly into the shape of the bottom 52, allowing the animal to drink nearly all the water in the bowl.

In a travel condition, or other condition of motion, the liquid in the water bowl is set into a chaotic state. As all other parts of the present invention are sealed, liquid that is splashed would exit the invention through the access opening 54. It is the goal, therefore, of the present invention to prevent any liquid from exiting that access opening 54, except in being drunk by an animal. As the reserve liquid 32a moves, the floating dish 24 generally moves with it. As may be observed in FIGS. 1, 2b and 3, the floating dish 24 is nearly the diameter of the inside of the bowl 26, while the access opening 54 is significantly smaller. The floating dish 24 rises with the liquid and stops against one or several webs 28 in the lid 20; this may be observed in FIGS. 4a and 4b. The floating dish 24 forms a loose seal with the lid 20 and blocks the main quantity of the reserve liquid 32a, preventing it from exiting through the access opening.

Figure 5A:
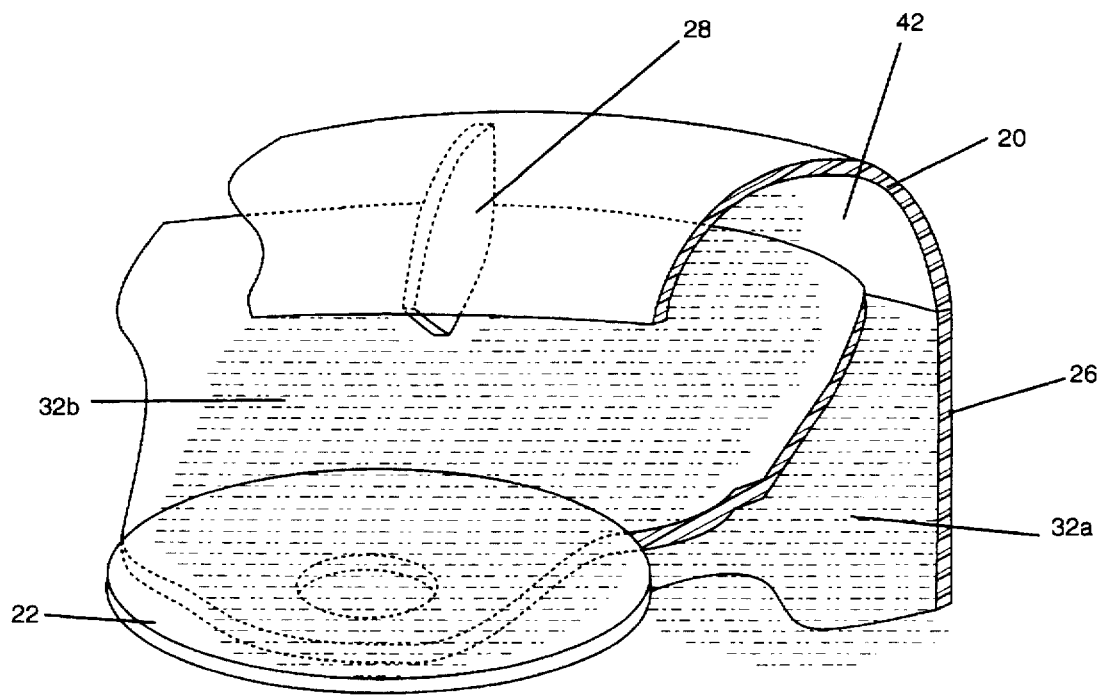
FIG. 5a is a cross-sectional, perspective detail view of the invention showing how the floating dish, curved lid and web combine to prevent splashing for the primary liquid.
Figure 5B:
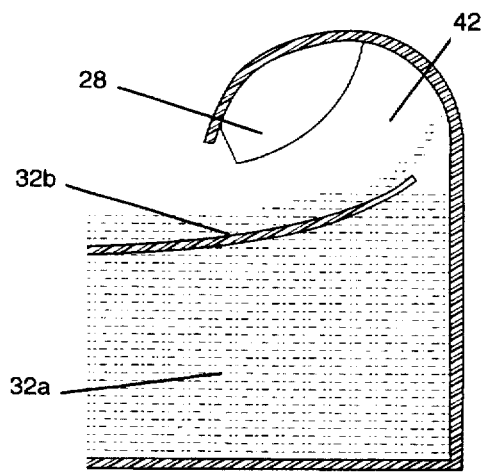
FIG. 5b is a vertical, sectional, detail view of the same process as seen in FIG. 5a, with water entering the splash chamber.
Figure 5C:
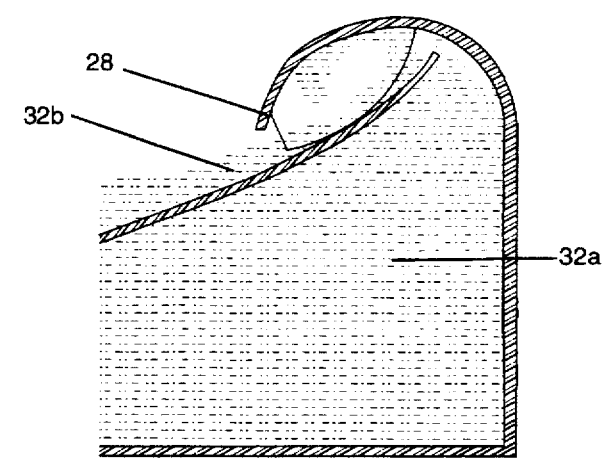
FIG. 5c is also a vertical, sectional, detail view of the same process as seen in FIG. 5a, with the floating dish closed against the web.

When the liquid surfaces are tilted, however, and the floating dish 24 concomitantly tilts with it, the floating dish 24 no longer necessarily fits tightly against the inside sidewall 50 of the bowl 26. The reserve liquid 32a could in such circumstance pass around the outer circumference of the floating dish 24. However, as again best observed in FIGS. 4a and 4b, as well as in FIG. 5c, when the floating dish 24 is forced against one or more webs 28, the liquid that flows around the outside diameter of the floating dish 24 is contained in the splash chamber 42, which is the curved inner hollow of the curved lid 20; the liquid follows the direction of the splash chamber 42, and returns to the top of the floating dish 24 as part of the primary liquid 32b.

When the present invention is in such a state of motion as is described above, the primary liquid 32b sloshes about in the floating dish 24. As is best observed in FIGS. 5a, 5b and 5c, the water sloshes to the side of the bowl 26. In some conditions, as in FIG. 5b, when the floating dish 24 has not risen to its maximum height, the primary liquid hits the sidewall 50 and either falls back into the primary liquid 32b, or is redirected by the splash chamber 42. If the floating dish 24 is at its maximum possible height, and is stopped against one or more webs 28, as in FIG. 5c, the web provides a gap between the surface of the floating dish 24, and the leading edge of the lid 20. This gap in the preferred embodiment is about one centimeter, but is not a critical dimension and may be more or less in other embodiments. The sloshing primary liquid 32b is prevented by the web 28 and the gap it provides from riding up on the curved lid 20. Instead the liquid flows under the leading edge of the curved lid 20, enters the splash chamber 42, whence its force is redirected and returned to the floating dish 24 and the primary liquid 32b.

Other embodiments of the function of the web 28 may be observed in FIGS. 7 and 8. In FIG. 7 the web 28 of the previous description is absent, but its function is taken by the addition to the curved lid 20 of a series of protrusions 44 to the inner edge of the curved lid 20. The floating dish 24 stops against these protrusions 44 in the same way in which it stopped against the web 28, again allowing liquid to flow under the curved lid 20 and into the splash chamber 42.

Again, in FIG. 8, the web 28 of the previous description is replaced. On the floating dish 24 are made radiating raised ribs 46, which once again stop the floating dish 24 against the curved lid 20, leaving a gap of a distance large enough to allow the liquid from the primary liquid supply to flow under the curved lid 20 and into the splash chamber 42.

When there is a rather more severe pressure applied to the various liquids of the present invention, as when the vessel is kicked or dropped from a moderate height, the liquid in the vessel moves very rapidly. Generally the splash controls described above function in such a condition, but in addition, the liquid is forced rapidly through the aperture 30 of the floating dish 24, the purpose of which is to facilitate rapid flow between the reserve liquid 32a and the primary liquid 32b. Uncontrolled, this liquid would be accelerated through the aperture 30 and out of the vessel. The cover plate 22, the function of which is best observed in FIGS. 6a and 6b, absorbs the energy of the jetting liquid, and redirects it to the sides where it becomes part of the primary liquid. Another embodiment of the cover plate 22 is the alternate cover plate 48, seen in FIG. 6d, which is placed below the aperture 30 on the underside of the floating dish 24.

SUMMARY, RAMIFICATIONS, AND SCOPE

Accordingly, it can be easily seen that the pet water vessel of the present invention quite adeptly contains the forces set upon a liquid in motion, and allows the transportation of such liquid in a convenient, utilitarian and secure manner. The device permits little or no splashing in moderately rough conditions of movement, and does so while allowing a very unrestricted access to the contents of the vessel. Furthermore, the present invention has additional advantages in that it will operate in a variety of sizes, allowing choices as to quantity of liquid carried, and size of pet accommodated.

may be manufactured quite economically.

may be easily dismantled for cleaning and reassembled.

will resist spilling well when kicked or dropped.

will function at home as well as in travel.

allows the pet to see the liquid it is drinking.

generally keeps the liquid in easy reach of the pet.

Although the descriptions contained in this application portray many specificities, these should not be construed as limiting the scope of the invention, but merely as providing illustrations of some of the presently preferred embodiments of the invention. The vessel could have other shapes or colors, for example, or the curves and shapes of the various components could have other shapes and forms and dimensions, yet still perform the functions of this invention in essentially the manner herein described.

The scope of this invention should be determined by the appended claims and their legal equivalents, rather than by the examples given.

I claim:

1. A liquid transportation vessel comprising the following elements:

(a) a bowl, and (b) a dish of a diameter larger than the diameter of said inner opening, said dish comprising material of predetermined dimensions so as to allow said dish to float at and near the surface of liquid in said bowl, and (c) an arched lid for fitting over said bowl, said lid being inwardly arched to an inner termination forming an inner opening having a diameter, wherein said arched lid comprises an inner surface comprising a plurality of webs of predetermined size formed at the inner surface of said arched lid, whereby said dish is directed beneath said arched lid to loosely abut against said arched lid by liquid contained in said bowl, and (d) means for sealingly connecting said arched lid with said bowl whereby liquid contained in said bowl can be transported or moved with little splashing out from said bowl while completely accessible.

2. The liquid transportation vessel of claim 1, further including a ring of buoyant material of predetermined size positioned beneath said dish for floating on liquid contained in said bowl.

3. The liquid transportation vessel of claim 1, wherein said dish comprises at least one aperture.

4. The liquid transportation vessel of claim 3, comprising a coverplate positioned a predetermined distance above said at least one aperture in said dish.

5. The liquid transportation vessel of claim 3, comprising a coverplate fixed a predetermined distance below said at least one aperture in said dish.

6. A liquid transportation vessel comprising the following elements:

(a) a bowl, and (b) a dish of a diameter larger than the diameter of said inner opening, said dish comprising material of predetermined dimensions so as to allow said dish to float at and near the surface of liquid in said bowl, and (c) an arched lid for fitting over said bowl, said lid being inwardly arched to an inner termination forming an inner opening having a diameter, wherein said arched lid comprises a plurality of lid protrusions of predetermined dimensions protruding from said inner termination of said arched lid, whereby said dish is directed beneath said arched lid to loosely abut against said arched lid by liquid contained in said bowl, and (d) means for sealingly connecting said arched lid with said bowl whereby liquid contained in said bowl can be transported or moved with little splashing out from said bowl while completely accessible.

7. The liquid transportation vessel of claim 6, wherein said dish comprises a plurality of raised ribs of predetermined dimensions radiating from a central area of said dish.

8. The liquid transportation vessel of claim 6, comprising liquid contained in said bowl.

9. An arched lid for fitting over a vessel, said lid comprising a shield inwardly arched to an inner termination forming an inner opening having a predetermined diameter, wherein said shield comprises an inner surface comprising a plurality of webs formed on the inner surface of said shield.

10. The arched lid of claim 9, wherein said shield comprises an inner surface comprising a plurality of lid protrusions protruding from the inner termination of said lid in lieu of said webs.

11. Apparatus for reducing splashing of liquid contained in a vessel, said apparatus comprising:

(a) a lid for fitting over a vessel containing liquid, said lid being inwardly arched to an inner termination forming an inner opening having a predetermined diameter, wherein said arched lid comprises an inner surface comprising a plurality of webs of predetermined size formed at the inner surface of said arched lid, and (b) a dish having a diameter larger than the diameter of said inner opening of said lid for positioning below said inner opening of said lid relative to liquid contained in a vessel over which said lid is fitted.

12. The apparatus of claim 11, wherein said dish comprises at least one aperture.

13. The apparatus of claim 12, comprising a cover plate positioned a predetermined distance above said at least one aperture in said dish.

14. The apparatus of claim 12, comprising a cover plate positioned a predetermined distance below said at least one aperture in said dish.

15. The apparatus of claim 11 wherein said lid comprises a plurality of protrusions of predetermined dimensions protruding from said inner termination of said lid in lieu of said webs.

16. The apparatus of claim 11, wherein said dish comprises a plurality of raised ribs of predetermined dimensions radiating from a central area of said dish.

\* \* \* \* \*